United States Patent [19]

Atchison

[11] Patent Number: 4,862,940
[45] Date of Patent: Sep. 5, 1989

[54] AWNING ASSEMBLY

[76] Inventor: Edward J. Atchison, 1210 Sunshine La., Payson, Ariz. 85541

[21] Appl. No.: 115,262

[22] Filed: Oct. 30, 1987

[51] Int. Cl.⁴ .......................................... E04F 10/06
[52] U.S. Cl. ................................ 160/67; 160/23.1; 296/163
[58] Field of Search ................. 160/67, 71, 66, 65, 160/45, 73, 74, 23.1, 26; 248/903, 188.5, 351; 135/89; 296/162, 163

[56] References Cited

U.S. PATENT DOCUMENTS

| 3,364,973 | 1/1968 | Railson | 160/71 X |
| 3,478,806 | 11/1969 | Darula | 160/45 |
| 3,779,302 | 12/1973 | Akers et al. | 135/89 X |
| 4,160,458 | 7/1979 | Marcellus | 135/89 |
| 4,673,155 | 6/1987 | Binder | 248/188.5 X |

Primary Examiner—Blair M. Johnson
Attorney, Agent, or Firm—Charles E. Cates; Richard G. Harrer

[57] ABSTRACT

An awning assembly including two elongated roller memers on which awning fabric is mounted. A first roller member is mounted to the side of a vehicle or building and the second roller member is pivotally mounted to the side of the vehicle or building and can be extended therefrom or retracted therto. The second roller member is provided with a cover which is generally U-shaped in cross section and strengthened in a special manner.

2 Claims, 2 Drawing Sheets

AWNING ASSEMBLY

FIELD OF THE INVENTION

This invention relates to awnings for use in providing shaded areas for recreational vehicles such as motor homes and travel trailers as well as buildings.

BACKGROUND OF THE INVENTION

The use of awnings to provide shade for buildings such as homes and commercial establishments and for recreational vehicles is well established. Most commercially available awnings are of the type which are made of a fabric such as canvas and are mounted to the side of a recreational vehicle or wall of a building in such a manner that the awning can be easily raised or lowered. That is, when shade is desired, the awning is lowered to an appropriate position and then can be rolled up during the period when shade is no longer wanted or during periods of bad weather.

In a typical awning installation of the foregoing type, the awning assembly includes two elongated rollers on which the awning fabric is mounted. One of the rollers is mounted to the side of the vehicle or building and an end of the fabric is attached to this roller. The other end of the fabric is attached to a second roller. A pair of braces or supports is attached to the ends of the second roller and then to the side of the vehicle or building to support the awning when it is unrolled and in an extended position to provide shade. Means are provided to raise and lower the awning and such means include a hand operated crank or an electric motor with appropriate gearing.

By their very nature awnings are subjected to great stresses and strains particularly when in the open or extended position. The area of fabric in an awning when in the extended position is large. For example, a typical awning assembly on a recreational vehicle can range up to twenty feet in length and can cover up to about one hundred and sixty square feet in area. Obviously, the awning acts as a sail and even rather mild winds can place great strains on the structure which holds the awning in place while in an extended position. Moreover, since the awning is exposed to the weather, it is desirable that the awning assembly, particularly when it is in a retracted position, be provided with suitable protection.

SUMMARY OF THE INVENTION

This invention provides an awning assembly having improved stability to the effects of wind when the awning assembly is in an extended position. This is accomplished by providing the assembly with a stabilizing arm which is pivotally mounted to the side of the vehicle or building and which engages the support arms which are employed to support the awning assembly in an open position. Additionally, this invention provides a cover for a portion of the awning assembly for protection from the elements when the awning is in a closed position. The invention further provides support arms which are extendible and provided with a non-metallic sleeve which serves to reduce friction and substantially eliminate electrolytic deterioration between the telescoping metallic members of the support arms.

DESCRIPTION OF THE DRAWINGS

Turning now to the drawings in which the presently preferred embodiments of the invention are illustrated and from which further features and advantages will appear.

DESCRIPTION OF PREFERRED EMBODIMENTS

Figure 1:
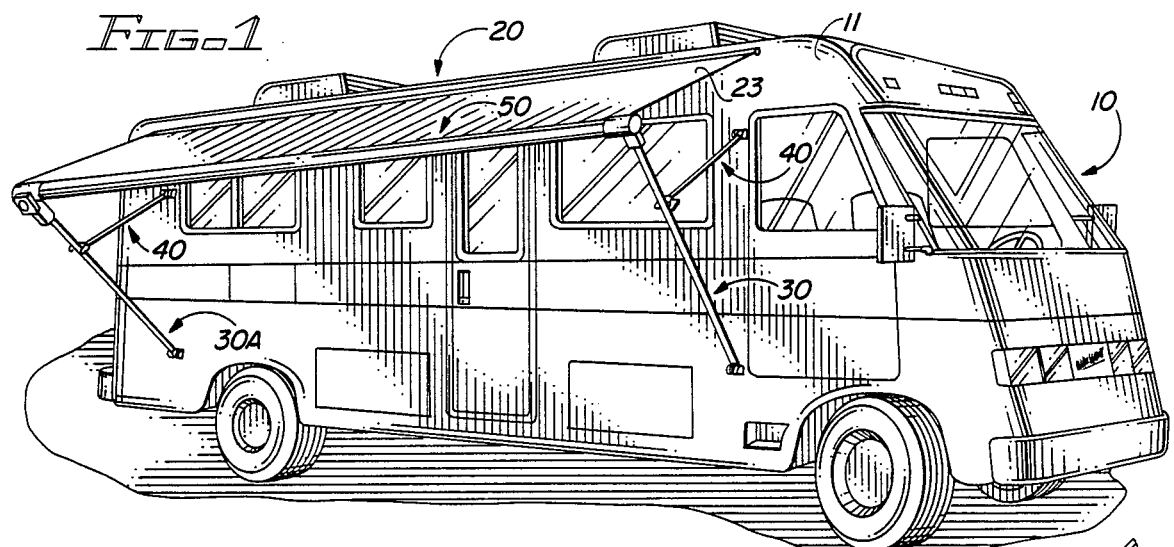
FIG. 1 is a perspective view of an awning assembly mounted to the side of a typical recreational vehicle.
Figure 3:
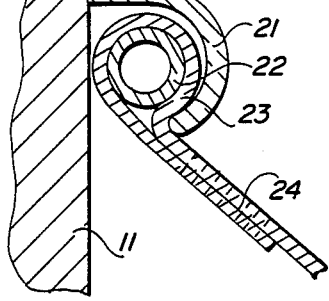
FIG. 3 is a sectional view taken along the line 3—3 of FIG. 2.
Figure 4:
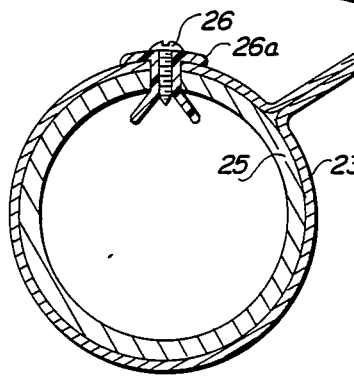
FIG. 4 is a sectional view taken along the line 4—4 of FIG. 2.

FIG. 1 shows an awning assembly in an extended position and mounted to the side 11 of a recreational vehicle shown generally at 10. Although the assembly as shown is mounted to a vehicle it will be appreciated that the assembly can be mounted to a building in a similar manner as will be shown herein. As shown best in FIG. 2, the awning is attached to the top of the vehicle by means of an awning rail shown generally at 20. Awning rail 21 is securely mounted to the vehicle by suitable fastening means. Positioned within the awning rail is a rigid tubular roller 22 and the awning 23 is fastened around the roller and attached to itself by means of an adhesive, rivets or other suitable fastening means at 24. At the opposite end of awning 23 is a second rigid tubular roller 25 to which the opposite end of the awning is secured. As shown in FIG. 4 the awning is wrapped about roller 25 and secured to itself. Because of the weight of the awning and roller 25 it is preferable to additionally secure the awning to roller 25 by means of screw 26 and anchor 26a.

Figure 2:
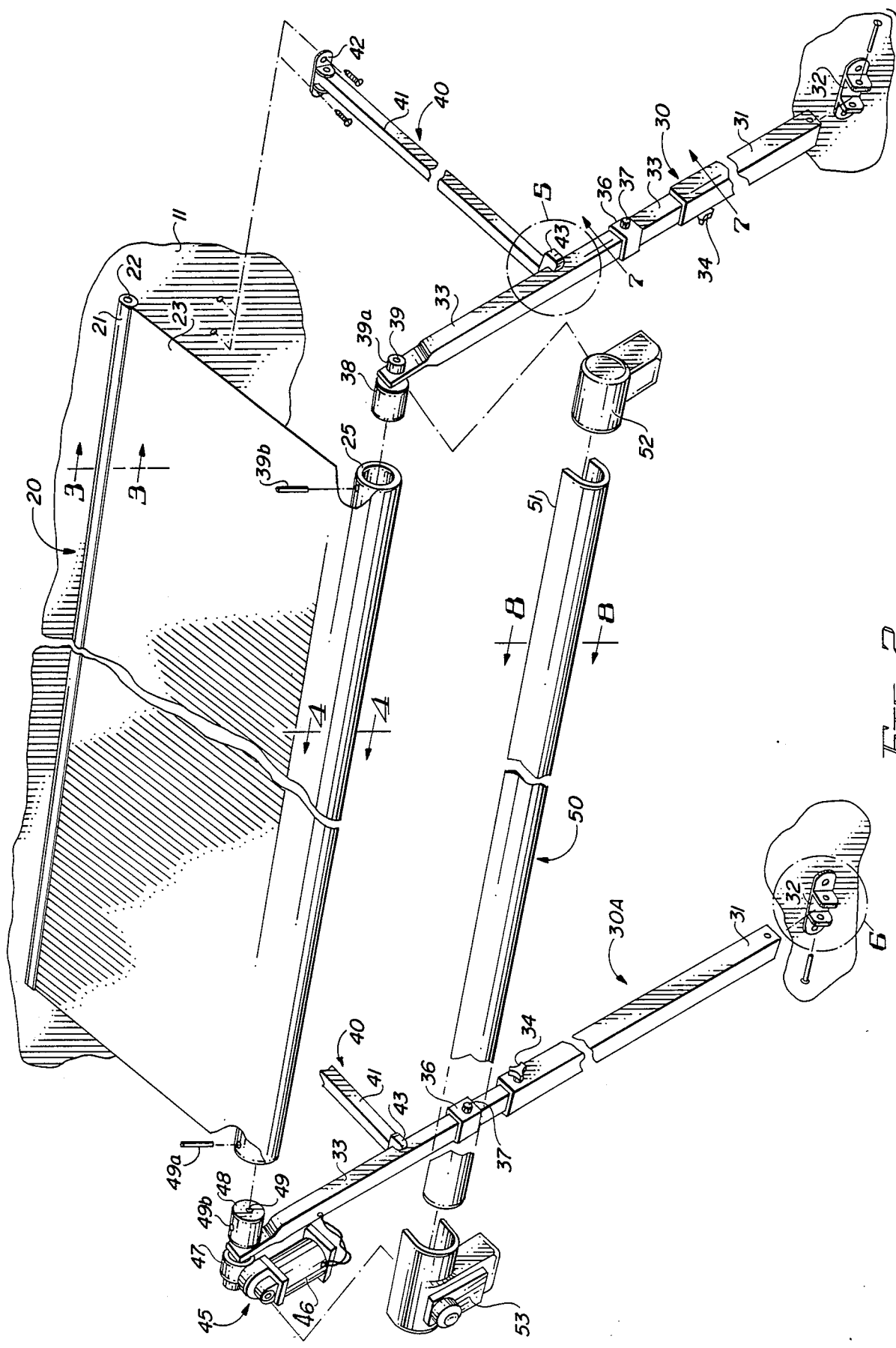
FIG. 2 depicts in perspective a detailed view of the awning assembly shown generally in FIG. 1.

As shown in FIG. 2, a pair of extendible support arms 30 and 30A are mounted to side 11 of the vehicle by means of brackets 32. The support arms include a lower member 31 and upper member 33 and in which rectangular tube member 33 telescopes into rectangular tube member 31. A locking screw 34 is provided on member 31 so that the total length of each of support arms 30 and 30A may be easily adjusted. Each of the support arms is pivotally mounted to bracket 32 which in turn is fastened to the side wall of the vehicle. The upper end of support arm 30 is provided with a cylindrical shaped idler roller 38 which is mounted on shaft 39 and then secured to the end of the support arm 30 by means of nut 39a. Idler roller 38 is inserted into the interior of rigid roller tube 25 and the tube and idler roller are fastened together by means of threaded fastener 39b which goes through roller tube 25 and is secured into idler roller 38. The upper end of rectangular tube member 33 is provided with a collar 36. Collar 36 is slidably mounted on tube member 33 and can be locked in any one of a number of positions by means of a set screw 37. Once the awning is in an appropriate open position, the collar 36 is positioned against the end of upper end of support member 31 and then locked in place by means of set screw 37.

The construction of support arm 30A is virtually identical to that of support arm 30 with the exception that the uppermost portion of support arm 30A is provided with means for raising and lowering the awning. Such means include drive assembly 45 including motor 46, which in the case of a recreational vehicle, is powered by 12-volt current. Motor 46 is mounted to a worm gear assembly 47 provided with shaft 49. Secured to shaft 49 is cylindrical shaped drive roller 48. Drive roller 48 in turn is securely mounted in the interior of tubular roller 25 by means of threaded fastener 49a which is inserted through tubular roller 25 and fastened into drive roller at 49b. Although not shown, motor 46 is connected by wiring to the interior of the vehicle to an appropriate switch. The switch is provided with three settings, up, down and off. When the awning is in an extended position as shown in FIG. 1 and FIG. 2, the "up" awning 23 is rolled about tube 25, gradually drawing the awning towards vehicle 10. Conversely, when the awning assembly is in the retracted position, that is mounted close to the side of the vehicle, activation of the "down" switch in the vehicle will cause the drive roller 48 to rotate in a clockwise direction causing the awning to be lowered to provide the appropriate shade.

Figure 5:
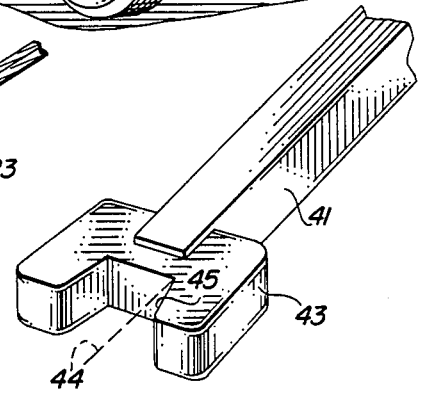
FIG. 5 is a perspective view in detail of the end of the stabilizing arm shown in FIG. 2.
Figure 6:
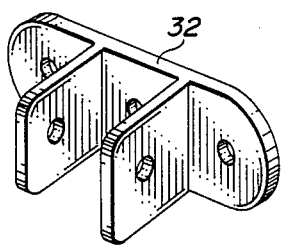
FIG. 6 and FIG. 6A are perspective views of brackets shown in FIG. 2.
Figure 6A:
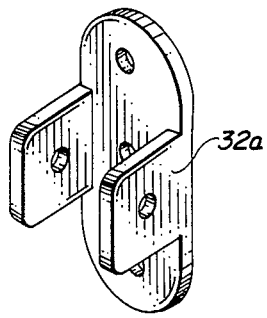

As previously noted, when the awning is in an extended position shown in FIG. 1 and FIG. 2, even moderate winds can cause a great deal of strain on the assembly because of the "sail effect" of the awning. A feature of this invention is the incorporation of a stabilizing means 40 in the awning assembly. Through the use of stabilizing means 40, or preferably a pair of such stabilizing means, the ability of the awning assembly to resist the stresses put on it from wind is greatly enhanced. As best shown in FIG. 2, such stabilizing means comprises stabilizing arm 41 which is pivotally mounted to the side of the vehicle by means of bracket 42. By such mounting stabilizing arm 41 is able to move vertically through an arc of about 180°. The opposite end of the stabilizing arm is provided with a generally U-shaped snubber 43. As shown in FIG. 5, snubber 43 is mounted to the end of stabilizing arm 41 by cutting a portion of opposite walls of tube 41 a distance and then force fitting the snubber into the end of arm 41. Snubber 43 is made of an elastomeric material such as neoprene rubber having a Durometer hardness of between 60 and 120, preferably about 90. Snubber 43 is notched out to securely engage support arms 30 or 30A. As shown in FIG. 2, the snubber 43 securely engages with upper rectangular tube member 33. Referring again to FIG. 5, it is preferred that walls 45 of the snubber be nonparallel. That is, the walls 45 are angled slightly from the perpendicular plane 44. An angle of about 8° works very well. To achieve the effect of the stabilizing arm assembly 40, the operator lowers the awning to a desired position. The operator then locks member 31 to member 33 in a suitable position by means of locking screw 34 and raises the stabilizing means 40 from the side of the vehicle to engage upper rectangular tube member 33 of support arms 30 and/or 30A. The fact that snubber 43 is elastomeric is important in that it causes the stabilizing arm to grasp the tubular member 33 a very secure manner. When the operator desires to raise the awning, all that need be done is that the operator lowers the awning a distance which causes the stabilizing arm assembly 40 to disengage from the support arm and fall to the side of the vehicle. Thereafter, the operator can then raise the awning to store it against the vehicle. This is important because if a storm should suddenly arise, the operator need not go outside the vehicle or building to disengage the stabilizing arm assembly.

Figure 7:
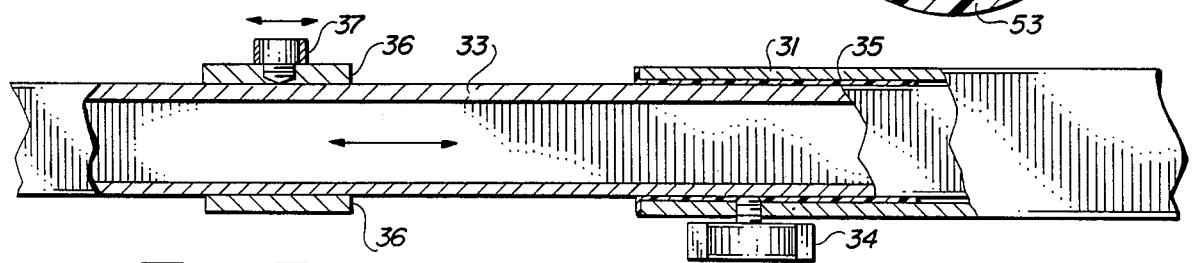
FIG. 7 is a sectional view taken along the line 7—7 of FIG. 2.

A further aspect of this invention is the provision of a non-metallic sleeve between the inner surfaces of lower rectangular tube member 31 and the outer surfaces of upper rectangular tube member 33, at the point where such members telescope together. As shown in FIG. 7, sleeve 35 surrounds upper tube member 33 at the point where it engages the inner surfaces of lower tube member 31. Sleeve 35 is a non-metallic material, preferably a plastic in sheet form such as polyvinylchloride, teflon and the like. Sleeve 35 serves to prevent any electrolytic activity which may take place between telescoping members 31 and 33. Additionally, the sleeve serves to substantially reduce any binding between members 31 and 33. A suitable sleeve will range from about 0.25–0.50 mm. in thickness and can be adhesively secured to that portion of upper tube member 33 in contact with the inner surfaces of tube member 31.

As previously noted, the awning assembly is provided with a cover assembly 50 best shown in FIG. 2. Cover assembly 50 includes an elongated U-shaped cover member 51 and end caps 52 and 53. Cover assembly 50 is constructed to partially enclose idler roller 38, rigid roller tube 25 with awning 23 rolled about tube 25 and the drive assembly 45 including motor 46, worm gear box 47 and drive roller 48. As shown in FIG. 2, the ends of U-shaped member 51 are inserted into end caps 52 and 53 which are also generally U-shaped.

Figure 8:
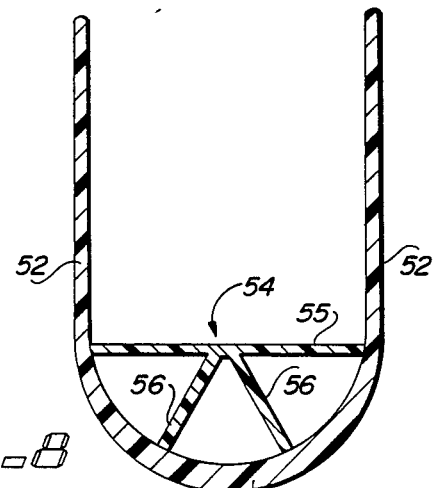
FIG. 8 is a sectional view taken along the line 8—8 of FIG. 2.

Referring to FIG. 8 it will be seen that U-shaped cover member 51 has substantially parallel side walls 52 which are joined by a curved wall 53. The curved wall portion 53 is of greater thickness than walls 51. It is preferred that member 51 be made of reinforced fiberglass with the thickness of walls 51 being about ⅛ inch and that of the curved wall 53 being about ⅜ inch. Cover member 51 is strengthened by means of reinforcing member 54 which consists of generally planar member 55 extending between and firmly anchored to walls 52 at a distance from the opening of said U-shaped cover 51 sufficient so that the cover will surround a substantial portion of elongated roller member 25. Moreover, the area between walls 52 sufficiently large to accommodate roller 25 including awning 23 when the awning is in retracted position. Additional strengthening of cover 51 is provided V-shaped member 56 which is secured to wall 53 and planar member 55. Reinforcing member 54 including planar member 55 and V-shaped member 56 can be constructed of fiberboard which has been coated with a fiberglass/resin mixture. When the cover assembly is constructed as aforesaid, it not only resists weathering, but is lightweight and even more importantly has virtually no sag even in lengths up to 20 feet.

I claim:

1. An awning assembly adapted for mounting to a vertical wall member such as the side of recreational vehicle or building comprising a first elongated roller member rotatably mounted to said vertical member, with one end of a piece of awning fabric fastened to said first roller member, the opposite end of said awning fabric being fastened to a second elongated roller member, a pair of support arms with one end of each of said support arms being pivotally mounted to said vertical member at a point below the mounting of said first roller member, the opposite ends of said support arms engaging the ends of said second roller member in such a manner as to support said second roller member and permit it to rotate on its longitudinal axis, means for rotating said second roller member in a clockwise or counterclockwise direction to thereby cause said awning fabric to roll about or unroll from said second roller member so as to extend or retract said awning, wherein the improvement comprises providing said second roller member with a cover which substantially surrounds said second roller member throughout its length, and when said second roller member is in an extended or retracted position, said cover being generally U-shaped cross section with substantially parallel planar side walls connected by a curved wall, said curved wall portion being of greater thickness than said side walls and wherein said cover is further strengthened by means of a planar reinforcing member extending between said side walls at a distance from the opening of said U-shaped cover sufficient so that the cover will surround a substantial portion of said second roller member.

2. The awning assembly of claim 1 wherein said cover is further strengthened by means of a generally V-shaped member positioned between said planar reinforcing member and the curved wall of said cover.

* * * * *